Oct. 6, 1931.  P. A. BORDEN  1,825,849

REGULATING APPARATUS

Filed April 18, 1929  3 Sheets-Sheet 1

INVENTOR.
Perry A. Borden
BY
ATTORNEY

Oct. 6, 1931.  P. A. BORDEN  1,825,849
REGULATING APPARATUS
Filed April 18, 1929   3 Sheets-Sheet 2
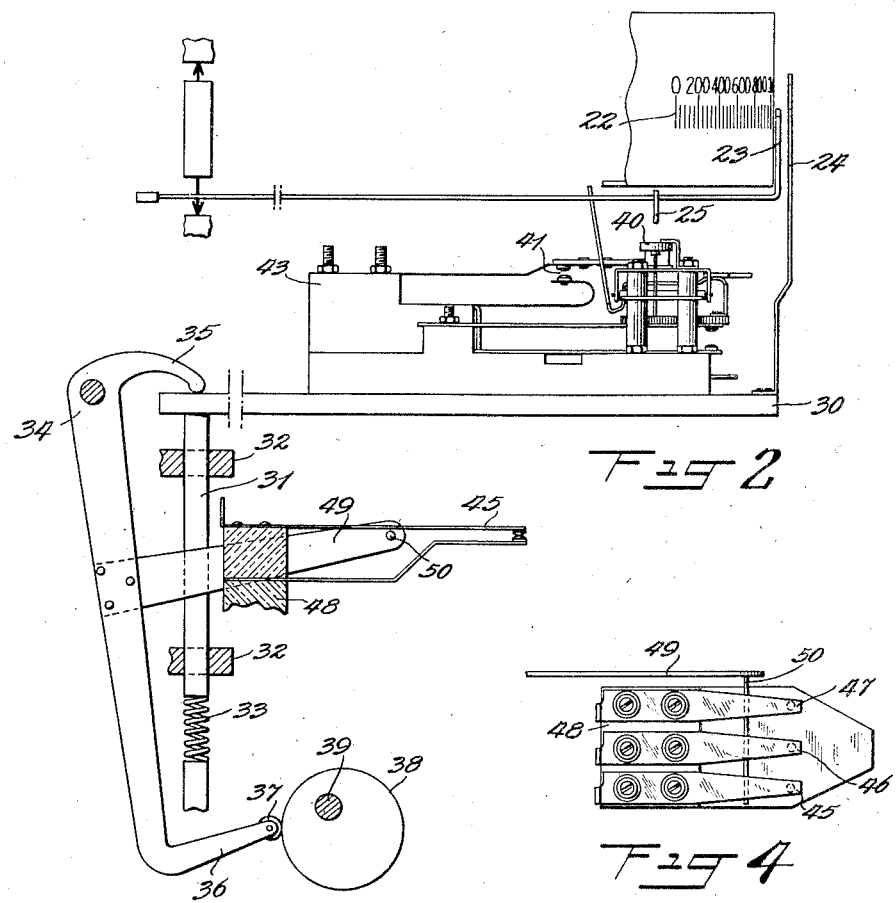
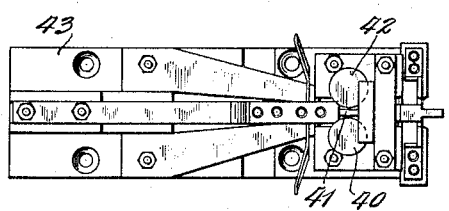
INVENTOR.
Perry A. Borden
BY
ATTORNEY Oct. 6, 1931.   P. A. BORDEN   1,825,849
REGULATING APPARATUS
Filed April 18, 1929   3 Sheets-Sheet 3

INVENTOR.
Perry A. Borden
BY
ATTORNEY

Patented Oct. 6, 1931

1,825,849

UNITED STATES PATENT OFFICE

PERRY A. BORDEN, OF WATERBURY, CONNECTICUT, ASSIGNOR TO THE BRISTOL COMPANY, OF WATERBURY, CONNECTICUT, A CORPORATION OF CONNECTICUT

REGULATING APPARATUS

Application filed April 18, 1929. Serial No. 356,278.

The invention relates to regulating apparatus of the automatic floating control type; and more particularly to contact-making means for and the arrangement of electric circuits controlled through the instrumentality of certain external conditions which, in turn, may be regulated through the action of said contact means; or, the said contact means may be caused to regulate other conditions or mechanism. For example, in the control of the flow of fluids, the degree of temperature, pressure, etc. of various media and other variable quantities essential to industrial processes, it is desirable to effect such control in a simple and positive manner and to afford convenient adjustment thereof.

Two distinct recognized systems for accomplishing the desired results are known, in the one of which an electrical contact, a valve or other portal through which the regulated medium is admitted to the element under control, is arranged to be either opened to its full extent or else to be completely closed with no position of rest between the two extremes. The desired mean of temperature, pressure, etc. is then obtained by varying the relative time of admission and stoppage of the medium; and by sufficiently frequent operation of the controlling device it is thus generally possible to maintain a fairly satisfactory mean value of the controlled quantity. For a closer regulation, however, it is necessary to by-pass a certain proportion of the medium through another channel and control only a part of the flow.

In the other system of control, the electrical contact, valve or other portal is arranged to pass a varying quantity of the regulated medium, according to its setting; and the actual position of the valve, etc. is to be varied according to the flow required—this system being commonly known as "floating control."

If manual control be available, the latter of the two systems is preferable and natural; but when placed under automatic control, difficulties and complications arise attendant upon the problem of bringing the valve or other portal to rest and of causing it to remain in that state so long as the value of the regulated medium does not depart from the desired value.

Mechanism for effecting this "on-and-off" or floating control, through the agency of electrical circuits, is well known, for example, as disclosed in U. S. Patent No. 1,675,359; and it is the object of the present invention to modify the system therein disclosed, more especially with reference to the electrical controlling apparatus and associated circuits.

To this end, the invention consists in the provision of two sets of intermittently-acting mechanically-operated electrical contacts with corresponding relays controlled thereby, one set of the contacts being adapted to complete a circuit to one of the respective relays upon the interposition of the pointer of the measuring instrument and the other set of contacts all operating in unison, irrespective of the pointer position, and serving to close and to open retaining circuits forming an auxiliary source of current supply to said relays.

The invention contemplates, also, novel contact-making means whereby adjustment of the zones of contact is possible.

The nature of the invention, however, will best be understood when described in connection with the accompanying drawings, in which:

Fig. 2 is a fragmentary side elevation, partly in section, illustrating the contact mechanism and actuating means therefor.

Figs. 3 and 4 are plan views of the main and the auxiliary contact mechanisms.

Figure 1:
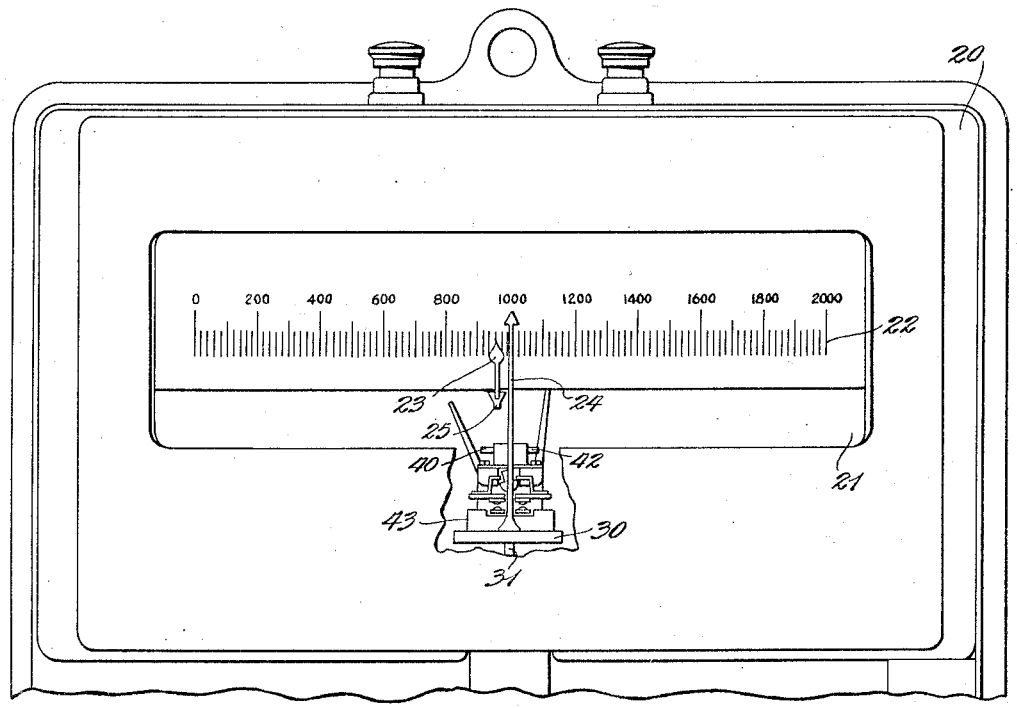
Fig. 1 is a fragmentary front elevation of a regulating apparatus embodying the novel features hereinafter described and with portion of the enclosing casing broken away.

Referring to the drawings, 20 designates the instrument casing having the window 21 through which is visible a suitably graduated scale 22 and in front of which is adapted to move, in the usual manner and as is well understood, a measuring pointer 23. The latter is operated by any of the well-known means for measuring temperatures, pressure, motion and the like; and the mechanism for effecting movement of said pointer forms no part of the present invention, which relates more particularly to the contact-making mechanism and circuits, associated with the pointer; and in the control by the latter of the former through the positioning of said contact-making mechanism, as hereinafter more fully set forth.

A setting pointer 24 is also associated with the scale 22 being located in proximity thereto and in front of the pointer 23, so that the one may be moved relatively to the other. The purpose of this setting pointer is to variously position the contact-making mechanism hereinafter set forth to different locations corresponding to the conditions desired and which will be indicated by the particular position of said pointer 24 relatively to the scale 22. It will be understood, of course, that no movement is thereby imparted to the measuring pointer 23 which is independently actuated, as hereinbefore set forth.

The said pointer 23 is bent substantially at right angles to its length to pass directly in front of the scale and extends backwardly from the window into the instrument casing. It has, moreover, depending therefrom a control element 25, the free edge of which is adapted to engage with a portion of the contact mechanism, when brought into juxtaposition therewith, and is under the influence of external conditions. When said contact mechanism is then moved for engagement with the aforesaid element 25, actuation of a contact or contacts thereof occurs to control a corresponding circuit for maintaining or restoring the desired external condition, it being undersood, however, that these particular contact elements in opening never act to break a circuit which they control.

The contact mechanism as well as the setting pointer 24 is carried by a boom or arm 30 which is mounted both for oscillation about an axis parallel to the pointer 23 and for bodily reciprocation in the direction of said axis of oscillation. To this end, the said arm is carried by a rod 31 mounted for reciprocation within bearings 32, the said rod being spring-urged upwardly by means of a coil spring 33.

In order to control the vertical position of said arm, a bell-crank 34 is arranged to have its upper arm 35 bear against the boom 30 while its opposite arm 36 carries a roller 37 which is adapted to be engaged by a cam 38 driven by a suitably actuated cam shaft 39. Normally, the arm 35 is held downwardly and thereby forces downwardly the rod 31 in opposition to the spring 33; whereas when the low part of the cam is in engagement with the roller of the bell-crank, said rod is free to move upwardly and will permit boom 30 to rise under the influence of the coil spring 33. The contact mechanism carried by said boom will thus be lifted into juxtaposition with the control element 25 of the pointer and engage therewith to actuate the particular contact element required.

The novel contact mechanism, carried by said boom, comprises a switch having the three adjacently disposed pairs of intermittent contacts 40, 41 and 42, which are secured to an insulation block 43 attached to said boom; and the said contacts are so positioned relatively to the pointer that they may be brought into juxtaposition with its control element 25 to close for a short interval a particular contact thereof when the boom is elevated, the contact opening again as soon as the boom gets well started on its downward travel.

A further set of contacts 45, 46 and 47 are supported on an insulating block 48 fixed to a portion of the frame of the instrument and are of a character normally remaining closed by the natural resilient action thereof. The said contacts, however, are arranged to be simultaneously opened in accordance with the movement of said boom, being controlled in this respect from the bell-crank 34 through an arm 49 rigidly attached to said bell-crank and projecting outwardly therefrom and having at its outer end a laterally extending insulating pin 50.

This pin is disposed in such a manner relatively to the said auxiliary contacts that when the boom is at its highest point of travel, it will enter and ride between the coacting contact elements of the three pairs to force the same apart and open the contact for a short interval of time, the contacts under their own resiliency immediately closing as the pin is withdrawn. The action is so timed that the auxiliary contacts do not open until the particular contact of the main contacts, which may have been in engagement with the pointer element, has been closed; but said auxiliary contacts again close prior to the opening of the aforesaid main contact. In other words, the auxiliary contacts remain closed at all times except for a momentary opening period which lies entirely within the closing interval of a main contact or contacts.

Figure 5:
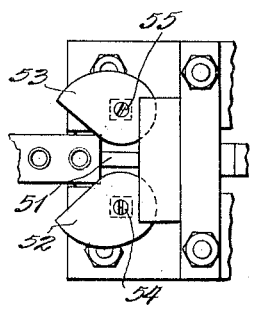
Figs. 5 and 6 are plan views illustrating modifications in the main contact mechanism.
Figure 7:
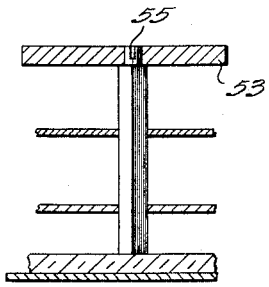
Fig. 7 is a fragmentary vertical section of the modified mechanism shown in Fig. 5.
Figure 6:
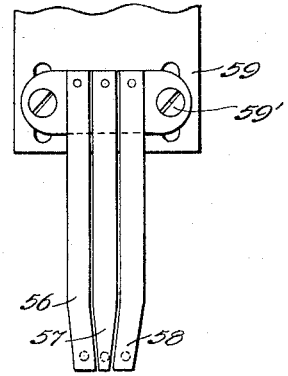

The effective width of the zones of influence of the several contacts may be varied in different ways. For example, reference being had to Figs. 5 and 7 of the drawings, the intermediate contact element 51 is of constant width while the arc of contact of two adjacent elements may be varied by providing cam-shaped heads 52 and 53 which are angularly adjustable on the split ends of their corresponding spindles 54 and 55. Or, as shown in Fig. 6, three adjacently disposed contact arms 56, 57 and 58 are carried by a block of insulation 59 and are tapered at their outer ends, that is to say, the intermediate element 57 is given a tapered form and the adjacent elements are made to lie parallel to the same. The carrying block 59 is slotted longitudinally and is adjustable thereby as a whole relatively to the boom, as through a holding screw 59', so that the length of arc traversed across the contact by the pointer element 25 varies with the particular radial location of the contact mechanism.

In accordance with the particular position in which such heads are held, the effective width or arc of possible engagement with the pointer element will be determined. It will be noted, also, in the former embodiment that although the zone of the intermediate engagement is not affected by the aforesaid arrangement, the zones of contact with the adjacent elements are independently adjustable, as may be required by conditions of operation.

Figure 8:
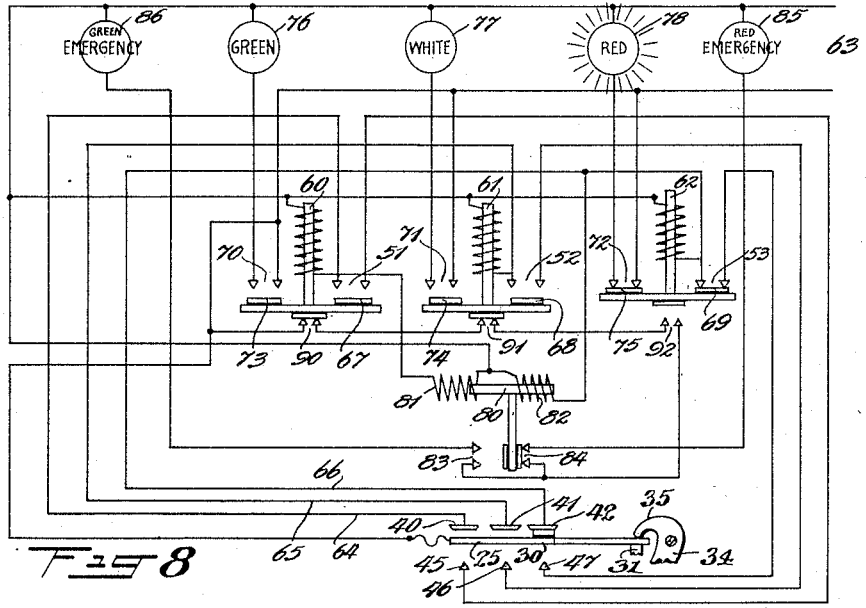
Fig. 8 is a wiring diagram illustrating the circuits involved in the novel system.

Associated with the contact mechanism aforesaid is a system of relays which may be suited to the particular control desired. For example, reference being had to Fig. 8 of the drawings, relays 60, 61 and 62 are provided, the same being actuated from a suitable source of power as the supply mains 63 and controlled by the respective contacts 40, 41 and 42 through leads 64, 65 and 66, respectively. Thus, the three contacts 40, 41 and 42 will correspond to the low, neutral and high positions of the instrument pointer 23 and as the particular contact is closed the corresponding relay will be energized; and this completes also an auxiliary circuit through the corresponding contact of the auxiliary contacts 45, 46 and 47 and bridging members 67, 68 or 69 of the corresponding relay. This auxiliary circuit is in parallel with the energizing circuit of the particular relay energized so that as long as the particular auxiliary contact of the contacts 45, 46 and 47 remains closed, the said energized relay will continue to be energized irrespective of the condition of a main contact 40, 41 or 42 which was originally responsible for its energization. As has hereinbefore been set forth, the auxiliary contacts open momentarily and only during the interval of time that any of the main contacts which may be in engagement with the pointer element 25 are closed. Therefore, upon the pointer element 23 engaging one of the main contacts 40, 41 or 42, the corresponding relay will be energized and remain so as long as the pointer remains in or near the position at which the relay was first energized.

Upon the pointer swinging out of engagement with the particular main contact aforesaid, its corresponding relay remains energized until the auxiliary contacts are opened, in which case, there being no circuit through the main contact, the relay is de-energized and falls to its open position, whereby any one (or two adjacent) of a group of relays may be energized and released in accordance with the position of the pointer of the measuring instrument, while the main contacts of the instrument are not required to break or open the circuits of said relays. It is evident, also that the number of relays operated is not limited but may be extended beyond those herein indicated, in fact, to embrace the whole scale of the instrument.

As a practical application of the system, the aforesaid relays 60, 61 and 62 may be caused to operate or control a group of signal lights indicative, for example, of the temperatures of industrial ovens or furnaces. To this end, each relay is provided with additional pairs of contacts 70, 71 and 72 which are adapted to be bridged respectively by bridging pieces 73, 74 and 75, respectively, when a corresponding relay is energized. Thus, the relay 60, when energized, may be caused to close the circuit to a signal lamp 76, the relay 61, a lamp 77, and the relay 62, a lamp 78. These lamps may respectively be colored green, white and red, corresponding to the low, neutral and high positions of the pointer 23. Provision is made, also, for auxiliary or emergency lamps to be cut into the circuit as by including a selector relay 80 in circuit, the same having two actuating coils 81 and 82, respectively, and the relay being of the type wherein when one coil is energized its armature is thrown to one of its two positions and remains therein until the other coil is energized, said armature then being drawn over to the new position and remaining therein until the first-named coil is again energized. This type of relay is well known in the art and forms no essential part of the present invention.

Circuit connections are such, moreover, that when relay 62 is energized, coil 82 of the auxiliary relay 80 will also be energized bridging one of the pairs of contacts 83 and 84; in the particular instance, the latter pair. This pair of contacts, furthermore, is in circuit with an additional red (emergency) lamp 85; but the circuit to said lamp remains uncompleted. Similarly, upon the relay 60 being energized, coil 81 of the auxiliary relay will also be energized and cause the contacts 83 to be bridged, which latter are included in a circuit of an extra, or green, lamp 86, but also not completing the circuit thereto. No electrical connection is made between the relay 61, representing the neutral position, and the auxiliary relay 80 which, therefore, does not respond in any way when the former relay is energized.

The common conductor of the circuits to the additional or emergency lamps 85 and 86 is carried through three pairs of contacts connected in series with each other, and with the particular pair of contacts 83 and 84 which may be in circuit. The three contacts in series are associated with the respective relays 60, 61 and 62 and are represented at 90, 91 and 92 to be closed on the de-energized position of the respective relays so that if all three of said relays are de-energized, current may flow through these contacts and the particular extra lamp which has previously been selected by the auxiliary relay 80.

A typical cycle of the operation of the light-controlling system is as follows: Assuming the pointer 23 to be in the central or neutral position, coinciding with the index or setting pointer 24 of the boom, relay 61 would be energized and will so remain as long as the pointer does not materially deflect from this position, which is determined by the width of the particular intermediate contact element. As long as the pointer remains in a position where it engages the contacts 41, the relay 61 remains energized through either the contacts 46 or 41; and the white light continues to burn, indicating that the system is being held at the desired condition. Now, for example, if the temperature rises slightly, the pointer 23 will swing upwardly on the scale a short distance, until upon elevation of the boom, it engages the particular contact element for energizing relay 62. This causes the red light to be illuminated; but the white light also remains illuminated as long as the circuit thereto is closed through the contacts of the relay 61. At the same time, the auxiliary relay 80 is thrown into action to close the circuit at the contacts 84, the extra or emergency lamp, however, not being illuminated as the circuit is interrupted at both of the contacts 91 and 92 due to the energization of the respective relays. Upon a further slight excursion of the pointer from the neutral position, the control element 25 is carried beyond its position of engagement with the contact 41, so that upon the first subsequent opening of the associated auxiliary contact 46 the relay 61, receiving no current through contact 41, will be de-energized and the white light corresponding thereto extinguished. This leaves the red light alone illuminated and serves to call attention to the fact that the temperature is approaching a dangerous degree. It has already been shown that for but a very slight deviation from neutral it is possible that the control element may set the relays of two adjacent lights so that, for example, both the white light 77 and the red light 78 will continue to burn.

Should the pointer 23 swing still further up the scale, relay 62 is similarly released, extinguishing the red lamp 78 corresponding thereto and at the same time completing the circuit at the contacts 92 for illumination of the emergency lamp 85 which indicates an abnormal departure of the temperature from the set value. It will be noted that this condition will be maintained no matter how much further up the scale the pointer may swing and that no changes in the lighting combination will be produced until the pointer element again engages one of the contact elements corresponding to relays 62, 61 or 60. It will be understood, of course, that various protective or alarm devices (not shown), either visual or audible, may be included in the circuit represented by the lights hereinbefore set forth for use either locally or at a remote point.

On the return movement beyond the neutral relay, relay 60 will be energized to light the green light 76 and, if the pointer continues still further down the scale, lamp 86 will eventually be lighted to call attention to an abnormal temperature condition.

Since the performance of the system is symmetrical on both sides of the neutral point, it will be noted that a system of control is involved wherein, by use of but three pointer-actuated contacts in the control instrument, it is possible to obtain seven distinct combinations—indicative of as many different temperature conditions. If desirable, this may, of course, be multiplied by the addition of suitable contact elements and relays operated thereby.

Figure 9:
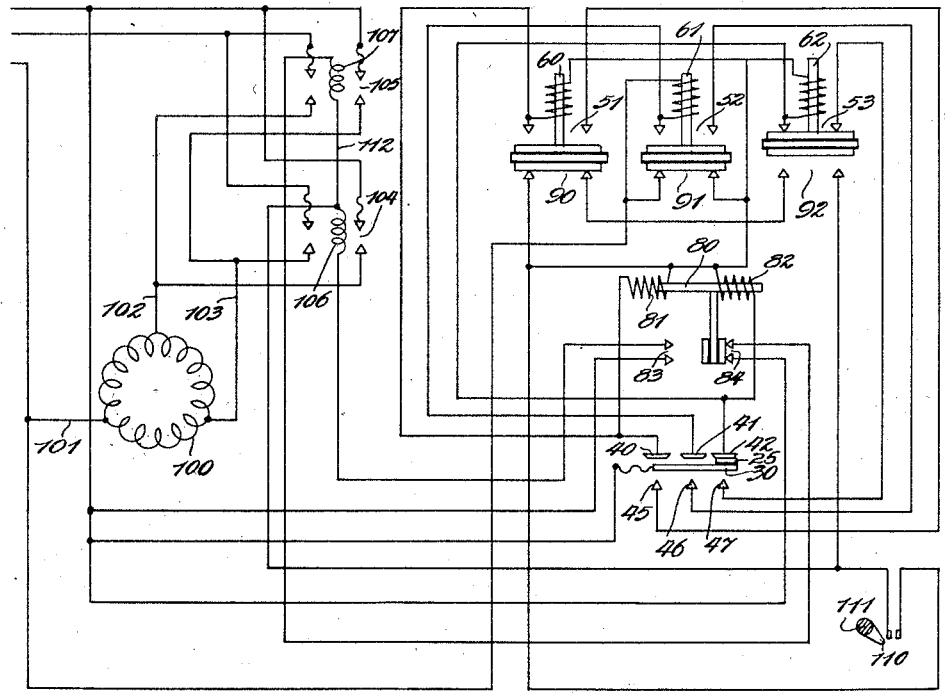
Fig. 9 is a similar view of a further extension of the system.

Referring to Fig. 9, the novel control system is indicated as applied to the operation of a reversing three-phase induction motor which may control a valve (not shown) for supplying heating medium to a furnace. In this arrangement, the performance of the several relays under the influence of the controlling contact elements is identical with that hereinbefore described in connection with the arrangement shown in Fig. 8, but contacts corresponding to the pairs 70, 71 and 72 are not employed in this instance. The motor 100 is of a standard squirrel-cage induction type whose reversal may be effected by the interchanging of any two of the three leads 101, 102 and 103 supplying current thereto. This change of circuits may be effected through the agency of two electrically-operated contactors 104 and 105, corresponding respectively to rotational directions for opening and for closing the valve. The actuating coils 106 and 107 of these contactors are energized through the auxiliary or selector relay 80 having the two pairs of contacts 83 and 84 respectively connected therewith. The relays 60, 61 and 62, when energized, close no contacts except their own contacts 51, 52 and 53 for their retaining circuits; but are arranged to each close a circuit at one point when the particular relay coil is released, as at the respective contacts 90, 91 and 92.

The arrangement hereinbefore described is such as to enable operation of the motor at two speeds—a slow speed when only small deviations of temperature exist, and a relatively high speed when a large change is required. While any of the standard methods of obtaining motor operation at either of two speeds is quite applicable to the present system of control, it has been found expedient to obtain the equivalent of slow speed operation of the induction motor 100 by periodically interrupting the circuit thereto, giving an "inching" action to the said motor.

This may be effected by means of an interrupter 110, having contacts independently driven by the shaft 111, which in turn may be continuously driven, for example, by the same motor (not shown) that actuates the main cam shaft 39 of the controlling instrument, or by a separate source of power, not shown. The interrupter contacts are connected in series with the common lead 112 of the two contactor coils 106 and 107. It will be understood that by adjustment of the period of the interrupter, it is possible to regulate the equivalent slow speed value over a wide range.

The contacts 90 and 92 of the relays 60 and 62 are connected to each other in a series relationship, and bridged across the interrupter contacts in such a manner that, when both of said relays are de-energized and the contacts 90 and 92 closed, there is afforded a shunt circuit around the interrupter 110, thus throwing the interrupter electrically out of action. It will therefore be understood that if either of the relays 60 or 62 is energized, with its corresponding contacts 90 or 92 open, the motor can operate only as the contactor 104 or 105 is closed through the interrupter 110; but if both said relays are de-energized, so that their contacts 90 and 92 are simultaneously closed, the interrupter is no longer capable of interfering with continuous operation of the motor.

The contacts 91 of the relay 61 are so connected that (whether the interrupter circuit be closed at contacts 110 or bridged through contacts 90 and 92) they form the only path through which the common circuit of the actuating coils 106 and 107 can be completed; so that with relay 61 energized, no operation of the motor is possible. However, with all three of the relays 60, 61 and 62 de-energized, the interrupter is bridged and the motor, together with its associated valve, may operate at normal full speed, and in the particular direction as determined by the selector or auxiliary relay 80.

The cycle of operation of the system, therefore, is as follows, assuming the pointer to be in a central position for energization of the neutral relay 61. Under these conditions, the common circuit to the contactor coils is open at the contacts 91 and no operation of the motor can take place. Assuming the temperature then to rise slightly, relay 62 will be energized, as will also the relay 80, the former cutting in the circuit for the interrupter 110 while the latter selects the contactor coil 105 to give the proper direction of rotation of the motor. No operation of said motor, however, takes place until relay 61 is de-energized and completes the circuit to the common lead of the contactor coil 105 which then operates subject to the mechanical interrupter 110 and the motor "inches" in the desired direction.

With sufficient effect thus produced, the pointer returns to the neutral zone and the motor is brought to a standstill until further adjustment is required. In the event that the rate of temperature reduction is not sufficient, the pointer swings further up the scale, releasing thereby relay 62, when interrupter 110 will be bridged, through the closing of both of the contacts 90 and 92, causing the motor to operate at full speed. This will continue until the cooling effect has been sufficient to cause the pointer to return to engagement with the contact 42 for energization of the relay 62 which restores the action of the interrupter, finally bringing the pointer to engagement with the neutral contact element 41 to energize relay 61 and bring the motor to a stop.

A similar cycle obtains on the low-temperature side of the scale; and it will thus be seen that there is obtained a full "floating-control" with two available speeds of operation. Of course, with a multiplication of contacts and associated relays, it would be possible to increase the number of operating speeds as well as by the use of a plurality of interrupters to provide for differing speeds of operation in opposite directions. It will be observed, also, that while the energization and release of any one (or two adjacent) of a group of the relays is accomplished in accordance with the position of the measuring pointer, yet the contact or control elements of the main set are not required to effect the actual break of the circuits of said relays.

I claim:

1. In regulating apparatus of the nature set forth, including measuring apparatus and a movable element actuated thereby: two sets of contact elements, one set being normally closed and the other set normally open and carried by a movable boom of the measuring apparatus, relays corresponding to the contact elements of the normally open set and adapted to be controlled thereby, mechanically operated means for periodically effecting opening in unison of all of the contact elements of the set of normally closed contact elements and the closing of a relay circuit at a selected contact of the other set and including in the latter instance the movable element of the measuring apparatus, and retaining circuits for said relays adapted to be closed at the said normally closed set of contact elements.

2. In regulating apparatus of the nature set forth, including measuring apparatus and a movable pointer element actuated thereby: two sets of contact elements, one set being normally closed and the other set normally open and carried by a movable boom of the measuring apparatus, relays corresponding to the contact elements of the normally open set and adapted to be controlled thereby, mechanically operated means for periodically effecting opening in unison of all of the contact elements of the set of normally closed contact elements only after a selected contact of the other set has been closed, and the closing thereof before the said selected contact again opens, and to effect the closing of a relay circuit at a selected contact of the normally open set and including in the latter instance the movable element of the measuring apparatus, and retaining circuits for said relays adapted to be closed at the said normally closed set of contact elements, and to remain so until the pointer element is no longer in juxtaposed relationship to a normally open contact element.

3. In regulating apparatus of the nature set forth, including measuring apparatus and a movable element actuated thereby: two sets of contact elements, one set being normally closed and the other set normally open and carried by a movable boom of the measuring apparatus, relays corresponding to the contact elements of the normally open set and adapted to be controlled thereby, mechanically operated means for periodically effecting opening in unison of all of the contact elements of the set of normally closed contact elements and the closing of a relay circuit at a selected contact of the other set and including in the latter instance the movable element of the measuring apparatus, retaining circuits for said relays adapted to be closed at the said normally closed set of contact elements, and contacts at the respective relays and included in the said retaining circuits for completing a retaining circuit when the relay corresponding thereto is energized.

4. In regulating apparatus of the nature set forth, including measuring apparatus and a movable element actuated thereby: two sets of contact elements, one set being normally closed and the other set normally open and carried by a movable boom of the measuring apparatus, relays corresponding to the contact elements of the normally open set and adapted to be controlled thereby, mechanically operated means for periodically effecting opening in unison of all of the contact elements of the set of normally closed contact elements and the closing of a relay circuit at a selected contact of the other set and including in the latter instance the movable element of the measuring apparatus, retaining circuits for said relays adapted to be completed at the said normally closed set of contact elements, additional contacts adapted to be closed by the relays when the latter are de-energized, and electrical responsive devices actuated by the closing of the additional contacts.

5. In regulating apparatus of the nature set forth, including measuring apparatus and a movable element actuated thereby: two sets of contact elements, one set being normally closed and the other set normally open and carried by a movable boom of the measuring apparatus, relays corresponding to the contact elements of the normally open set and adapted to be controlled thereby, mechanically operated means for periodically effecting opening in unison of all of the contact elements of the set of normally closed contact elements and the closing of a relay circuit at a selected contact of the other set and including in the latter instance the movable element of the measuring apparatus, retaining circuits for said relays adapted to be completed at the said normally closed set of contact elements, additional contacts adapted to be closed by the relays when the latter are de-energized, and electrical responsive devices actuated by the closing of the additional contacts and indicative of the electrical condition of a corresponding relay.

6. In regulating apparatus of the nature set forth, including measuring apparatus and a movable element actuated thereby: two sets of contact elements, one set being normally closed and the other set normally open and carried by a movable boom of the measuring apparatus, relays corresponding to the contact elements of the normally open set and adapted to be controlled thereby, mechanically operated means for periodically effecting opening in unison of all of the contact elements of the set of normally closed contact elements and the closing of a relay circuit at a selected contact of the other set and including in the latter instance the movable element of the measuring apparatus, retaining circuits for said relays adapted to be closed at the said normally closed set of contact elements, and means to adjust the arc of contact of the normally open set of contact elements.

7. In regulating apparatus of the nature set forth, including measuring apparatus and a movable element actuated thereby: two sets of contact elements, one set being normally closed and the other set normally open and carried by a movable boom of the measuring apparatus, relays corresponding to the contact elements of the normally open set and adapted to be controlled thereby, mechanically operated means for periodically effecting opening in unison of all of the contact elements and the closing of a relay circuit at a selected contact of the other set and including in the latter instance the movable element of the measuring apparatus, retaining circuits for said relays adapted to be closed at the said normally closed set of contact elements, a double actuating-coil auxiliary relay having oppositely disposed contacts and electrical means controlled thereby, and additional contacts for the respective said retained relays adapted to be closed when the latter are de-energized to energize thereby circuits controlled through the said auxiliary relay.

8. In regulating apparatus of the nature set forth, including measuring apparatus and a movable element actuated thereby: two sets of contact elements, one set being normally closed and the other set normally open and carried by a movable boom of the measuring apparatus, relays corresponding to the contact elements of the normally open set and adapted to be controlled thereby, mechanically operated means for periodically effecting opening in unison of all of the contact elements of the set of normally closed contact elements and the closing of a relay circuit at a selected contact of the other set and including in the latter instance the movable element of the measuring apparatus, retaining circuits for said relays adapted to be closed at the said normally closed set of contact elements, a double actuating-coil auxiliary relay having oppositely disposed contacts and electrical means controlled thereby, and additional contacts for the respective said retained relays adapted to be closed when the latter are de-energized to energize thereby circuits controlled through the said auxiliary relay, the said additional contacts of said respective relays being connected in series.

9. In regulating apparatus of the nature set forth, including measuring apparatus and a movable element actuated thereby: two sets of contact elements, one set being normally closed and the other set normally open, a boom carrying said latter set of contacts and adjustable relatively to the movable element, relays corresponding to the contact elements of the normally open set and adapted to be controlled thereby, means for periodically effecting opening in unison of all of the contact elements of the set of normally closed contact elements and for closing of a relay circuit at a selected contact of the normally open set and including in the latter instance the movable element of the measuring apparatus, and retaining circuits for said relays adapted to be closed at the said normally closed set of contact elements.

10. The combination with measuring apparatus, a movable pointer actuated thereby, a boom adjustable relatively thereto, and means to move the same periodically into juxtaposed relationship with said pointer; of regulating apparatus controlled thereby and comprising two sets of contact elements, one set being normally closed and the other normally open, relays corresponding to the contact elements of the normally open set and adapted to be controlled thereby, means conforming to the movement of the boom for periodically effecting opening in unison of all of the contact elements of the set of normally closed contact elements and the closing of a relay circuit at a selected contact of the other set and including in the latter instance the movable pointer element of the measuring apparatus, and retaining circuits for said relays adapted to be closed at the said normally closed set of contact elements.

11. The combination with measuring apparatus, a movable pointer actuated thereby, a boom adjustable relatively thereto, and means to move the same periodically into juxtaposed relationship with said pointer; of regulating apparatus controlled thereby and comprising two sets of intermittently acting electrical contacts, relays corresponding to the said contacts, and circuits thereto, one set of contacts being normally open and adapted to complete the circuits to the respective relays upon the interposition of the said movable pointer, and the other set of contacts being normally closed and adapted to be opened in unison irrespective of the pointer position, and auxiliary energizing circuits to said relays adapted to be closed at said normally closed set of contacts.

12. The combination with measuring apparatus, a movable pointer actuated thereby, a boom adjustable relatively thereto, and means to move the same periodically into juxtaposed relationship with said pointer; of regulating apparatus controlled thereby and comprising a main set and auxiliary set of electrical contacts, the contacts of the main set being adapted to be selectively operated and controlled by the movement of said boom, according to the position of the movable pointer, and the contacts of the auxiliary set to be opened in unison irrespective of the position of the pointer, the actuation of both of said sets of contacts being in such sequence that the selected main contacts and the auxiliary contacts are not open at the same time, and relays controlled by the action of said contacts.

13. The combination with measuring apparatus, a movable pointer actuated thereby, a boom adjustable relatively thereto, and means to move the same periodically into juxtaposed relationship with said pointer; of regulating apparatus controlled thereby and comprising a main set and auxiliary set of electrical contacts, the contacts of the main set being adapted to be selectively operated and controlled by the movement of said boom, according to the position of the movable pointer, and the contacts of the auxiliary set to be opened in unison irrespective of the position of the pointer, the actuation of both of said sets of contacts being in such sequence that the selected main contacts and auxiliary contacts are not open at the same time, relays adapted to be energized through the closing of the contacts of the main set, and circuits closed at said relays when thus energized and including the auxiliary contacts, the arrangement being such that a relay once energized will remain thus energized until the pointer fails to engage the corresponding contact of the main set controlling said relay.

In testimony whereof I affix my signature.

PERRY A. BORDEN.